(12) United States Patent
Mathues et al.

(10) Patent No.: US 8,555,447 B2
(45) Date of Patent: Oct. 15, 2013

(54) MULTIPLE PEELING BRUSH AND SPACER

(75) Inventors: Thomas P. Mathues, Creston, IA (US); Chris Hudson, Lenox, IA (US)

(73) Assignee: Vanmark Equipment, LLC, Creston, IA (US)

( * ) Notice: Subject to any disclaimer, the term of this patent is extended or adjusted under 35 U.S.C. 154(b) by 371 days.

(21) Appl. No.: 12/907,279

(22) Filed: Oct. 19, 2010

(65) Prior Publication Data

US 2012/0090109 A1 Apr. 19, 2012

(51) Int. Cl.
*A23N 12/00* (2006.01)
(52) U.S. Cl.
USPC .......................................... 15/88.3; 15/21.1
(58) Field of Classification Search
USPC ................... 15/88.3, 257.01, 88.2, 21.1, 102
See application file for complete search history.

(56) References Cited

U.S. PATENT DOCUMENTS

| 3,745,914 A | 7/1973 | Wallace |
| 7,069,846 B2 * | 7/2006 | Van der Schoot ............... 99/626 |
| 7,162,765 B2 * | 1/2007 | Harbison et al. .................. 15/77 |
| 2007/0174982 A1 * | 8/2007 | Lin .................................. 15/77 |

* cited by examiner

*Primary Examiner* — Shay Karls
(74) *Attorney, Agent, or Firm* — Jason H. Foster; Kremblas & Foster

(57) ABSTRACT

A brush assembly using a spacer and the spacer permit multiple brushes to be combined on a driveshaft that is driven in rotation. The use of multiple brushes allows one to vary the characteristics of the brush assembly along the assembly's length. This also permits one to change fewer than all brushes when needed, thereby saving the cost of replacing an entire brush assembly's brushes when worn. The spacer is a body with a central opening that is preferably polygonal in section, opposing ends that form shoulders and a radially extending gasket located intermediate the opposing ends.

8 Claims, 2 Drawing Sheets

US 8,555,447 B2

MULTIPLE PEELING BRUSH AND SPACER

BACKGROUND OF THE INVENTION

The invention relates to machines used to mechanically peel, clean and otherwise mechanically treat the outer surfaces of food items, including at least potatoes, carrots, beets, radishes and onions.

It is known in the food processing industry that food items must be cleaned prior to sale or further processing. In order to accomplish the cleaning of food items in an efficient manner, machines are commonly used. Some machines use water sprayed at high velocity to dislodge soil, microbes and other matter from the exterior of the food item. Other machines use brushes and water while still other machines use other rapidly rotating surfaces to clean food items, and can alternatively remove the skin or outer layer of the food items.

In one known example of such a machine, an Abrasive Peeling Apparatus is described in U.S. Pat. No. 3,745,914 to Wallace, which is incorporated herein by reference. The Wallace patent describes a machine that uses a plurality of rotatable elongated rollers with an abrasive outer surface adapted to move the material to be peeled along the length of the rollers. The material to be peeled is fed into an inlet opening in one end of the apparatus and the abrasive rollers carry the product and urge it toward the opposite outlet end while peeling the product. Driving means, such as electric motors, rotate each of the rollers, preferably in the same direction.

Several versions of peeling and cleaning machines are also sold by Vanmark Equipment, LLC of Creston, Iowa, including the Peeler/Scrubber/Washer series 2400, 2600, 2800 and 2900 machines. Such machines use abrasive rollers, which can include a plurality of cylindrically shaped brushes that are rotatably driven by a motor. Such brushes can clean and/or peel the food products being conveyed past the rotating brushes, such as by gravity, auger or other conveyance device. Whether the food product is cleaned or peeled is determined by the rotating speed, stiffness, bristle diameter and material and other parameters of the machine that are known to those of skill in the technology.

An example of the brush assembly 10 used in the machines described above is shown in FIG. 1 and is formed with a cylindrical central tube 12 from which radial bristles 14 extend to form a circular cylindrical circumference that strikes food items as they pass through the machine. The tube's central passage 16 is at least partially square, thus permitting a square driveshaft 18 to extend therethrough, resulting in a driveshaft supporting, and imparting a rotary motion to, each brush assembly. A preferably square driven end 20 is inserted into a matingly shaped square cavity on a driven component, such as a pulley or gear (not shown), thereby imparting rotary motion to the brush 10.

It is desirable to occasionally replace worn brushes in the machines described above, and this is typically accomplished by removing the brush and driveshaft as an assembly, threadingly removing a nut 24 from one end and slidingly and axially withdrawing the driveshaft 18 from the brush's central passage 16. A new brush is placed on the driveshaft and the entire assembly is reinserted into the apparatus.

It is also desirable to prevent food particles from entering the central passage because cleaning the passage is difficult. It is known to insert annular, flexible end fittings or fixtures 30 in an annular gap between the driveshaft 18 and the inside of the brush's central core to support the brush 10 on the driveshaft and to reduce the amount of food particles that can enter the central passage of the brush.

BRIEF SUMMARY OF THE INVENTION

A rotatable, elongated brush assembly is described herein having advantageous characteristics. A driveshaft extends through the assembly so that the assembly can be drivingly linked to a rotating drive member, such as a pulley, gear or motor. The brush assembly has a first elongated brush with a central tube through which the driveshaft extends. Bristles extend radially from the central tube, which has opposing first and second ends. A second elongated brush has a central tube through which the driveshaft extends, bristles extending radially therefrom and opposing first and second ends. The second brush is substantially coaxial to, and aligned in series on the driveshaft with, the first brush. In one embodiment, the second brush is different from the first brush so that if food items are placed in contact with the brush assembly the first brush will have a different effect on the food item than the second brush.

First, second, third and fourth end fittings are disposed near the respective ends of the central tubes between the driveshaft and the central tubes to form a support between the driveshaft and the central tubes. A spacer is mounted between, and seats against, the second and third end fittings and is mounted between adjacent ends of the brushes. The spacer has a body with radially outwardly facing shoulders at opposing body ends, which are preferably circular cylinders. A plurality of inwardly facing sidewalls angled relative to one another join at intersections to define a central passage of the spacer through which the driveshaft extends. A gasket extends radially outwardly from the body a substantial distance to permit the adjacent ends of the brushes to seat against opposing sides of the gasket and against the shoulders to form a sealed juncture.

The brush assembly has many advantages, such as the fact that the brushes can have different characteristics. In one example, a softer brush is used at one end and a coarser brush at the opposite end. Additionally, the spacer forms a seal between the brushes to reduce or prevent food particles from entering the central tubes.

Figure 1:
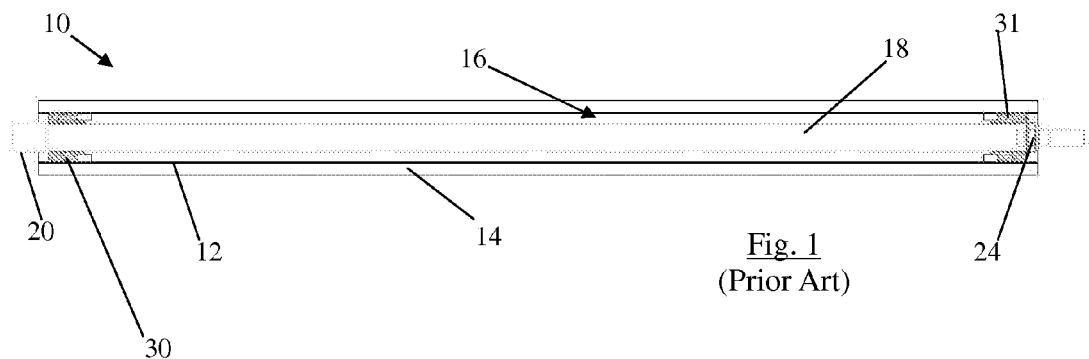
FIG. 1 is a side view in section illustrating a prior art driveshaft and brush assembly.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 2:
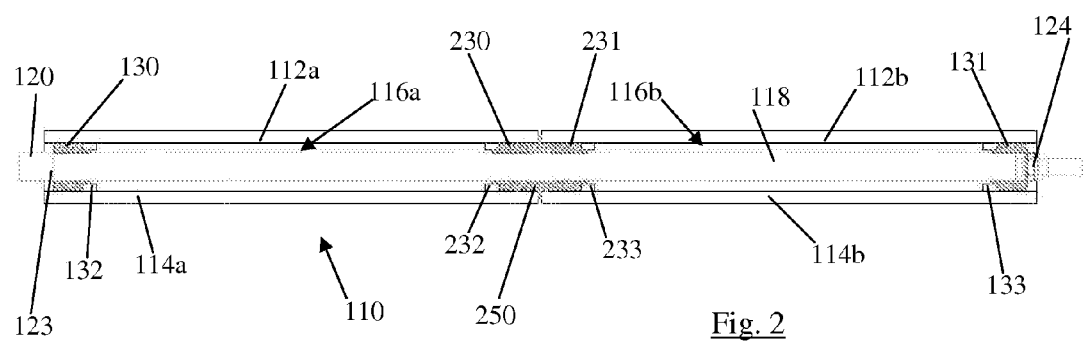
FIG. 2 is a side view in section illustrating an embodiment of the present invention.
Figure 3:
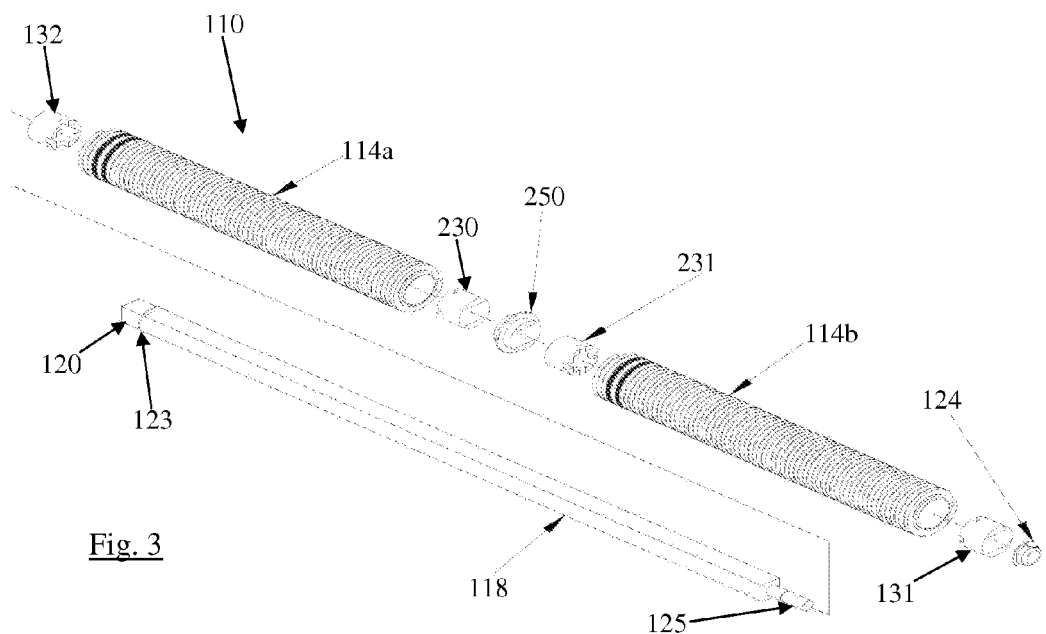
FIG. 3 is an exploded view in perspective illustrating the embodiment of FIG. 2.

The brush assembly 110 shown in FIGS. 2 and 3 resembles the brush assembly 10 shown in FIG. 1 in some respects. The substantially square drive shaft 118 extends from one end to the other of the brush assembly 110, extending through a pair of brushes 114a and 114b, each having cylindrical central tubes 112a and 112b from which radial bristles extend to form circular cylindrical circumferences. The central tubes' central passages 116a and 116b are large enough to permit the driveshaft 118 to extend therethrough. A preferably square driven end 120 is inserted into a matingly shaped square cavity on a driven component, such as a pulley or gear (not shown), thereby imparting rotary motion to the brush assembly 110 in a conventional manner.

The brush assembly 110 is assembled by disposing the driveshaft 118 as shown in FIG. 3. The annular end fitting 132 is slid onto the driveshaft 118. The end fittings described herein are preferably an elastomeric material, such as urethane or other food-grade material, with a central passage that is substantially the same shape and size as the outer surface of the driveshaft 118. The end fitting 132 is placed over the driveshaft 118 and slides to the end of the shaft until it abuts the radial shoulder 123, which is rigidly mounted to the driveshaft 118. In this position, a moderately effective seal is formed between the juncture of the abutting surfaces of the end fitting 132 and the driveshaft 118. This seal improves greatly when the nut at the end of the driveshaft is tightened (as described below) and the end fittings are placed in a state of compression.

The driveshaft 118 is next extended through the central passage 116a of the brush 114a. The central passage 116a is substantially larger in diameter than the driveshaft 118, thereby forming a gap therebetween that is filled, at least at the ends of the brush 114a, by the end fittings 130 and 230. The end fitting 230 is substantially identical to the end fitting 132, but is oriented in the opposite direction on the driveshaft 118 and positioned at the end of the brush 114a opposing the end fitting 132.

A plurality of slots is formed in the inwardly facing ends of the end fittings 130 and 230, which slots receive the lugs 132 and 232 (see FIG. 2) rigidly mounted to, and circumferentially spaced on, the radially inwardly facing surface of the central tube 112a. The lugs 132 and 232 insert into the slots in the end fittings 130 and 230, and thereby restrict how close the end fittings can come to one another, while preventing substantial rotation of the end fittings relative to the brush 114a. Because the end fittings 130 and 230 have square central openings, the rotary motion of the square driveshaft 118 is transferred to the brush 114a.

Figures 4, 5:
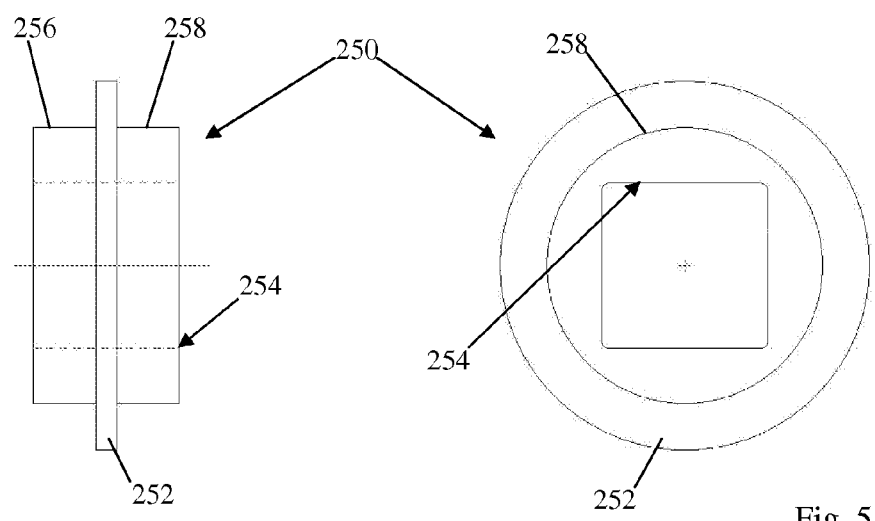
FIG. 4 is a side view illustrating a preferred embodiment of the spacer shown in the embodiment of FIG. 2.
FIG. 5 is an end view illustrating the spacer of FIG. 4.

After the end fitting 230 is mounted on the driveshaft 118 at the position shown in FIG. 2, the spacer 250 is mounted on the driveshaft 118. As shown in more detail in FIGS. 4 and 5, the spacer 250 is an annular body having square inner sidewalls 254 defining a central opening that is substantially the same shape and size as the driveshaft 118. The spacer 250 is preferably an elastomeric material, such as urethane or other food-grade material, and therefore the driveshaft 118 inserts slidably into its central opening. The spacer 250 has the same radially expanding characteristics as the end fittings when placed in a state of compression as described briefly above and in more detail below. Thus, the spacer 250 initially forms a moderately good seal where it abuts the driveshaft, but it expands radially inwardly and outwardly when placed in compression, thereby seating the sidewalls 254 tightly against the outer surface of the driveshaft 118, which creates a substantially water and food particle-proof seal at the juncture of the abutting surfaces.

The spacer 250 has a pair of opposing, radially outwardly facing shoulders 256 and 258 that are preferably circular cylindrical and substantially the same diameter as the inwardly facing surfaces of the central tubes 112a and 112b. A gasket 252 extends radially outwardly from the juncture of the shoulders 256 and 258, and is preferably substantially equidistant from the opposing ends of the spacer 250. The spacer 250 can be any size, as will be understood by a person having ordinary skill from the description herein, to meet the requirements of the cooperating components. In one contemplated embodiment, the spacer 250 is about 1.78 inches long, the gasket 252 is about 0.25 inches thick and about 4.50 inches in diameter, the diameter of the shoulders 256 and 258 is about 3.36 inches and the central opening in the spacer 250 is about 2.02 inches square.

When the spacer 250 is mounted on the driveshaft 118, it is displaced along the length of the driveshaft 118 until one end seats against the end fitting 230 as shown in FIG. 2. This can be accomplished by simply manually forcing the spacer 250 toward and into the central tube 112a. When the shoulder 256 is extended into the central tube 112a a moderately good seal is formed at the juncture of the abutting surfaces. However, upon compression as described below, an excellent seal is formed.

Next, the end fitting 231, which is substantially identical to the end fitting 130, is placed on the driveshaft in the same orientation as the end fitting 130. The end fitting 231 is abutted against the spacer 250 opposite the end fitting 230. The brush 114b is then placed on the driveshaft 118 in a similar orientation as the brush 114a, but with the leftmost end (in the illustration of FIG. 2) over the end fitting 230 and the shoulder 258.

In order to operably mount the brush 114b on the driveshaft 118, the slots of the end fitting 230 must receive the lugs 233 that are mounted to the inwardly facing surface of the central tube 112b. Furthermore, the leftmost end (in FIG. 2) of the brush 114b must extend around the shoulder 258 of the spacer 250 in order for the shoulder 258 to fit within the central opening 116b of the central tube 112b. This can be accomplished by manually forcing the central tube 112b toward the spacer 250. Once this occurs, the end fitting 230 abuts the proximal end of the spacer 250, and a moderately good seal is formed at the juncture of the abutting surfaces.

After the brush 114b is in position on the driveshaft 118, the end fitting 131, which is substantially the same as the end fitting 130, is placed on the driveshaft 118, and into the end of the brush 114b. The slots on the end fitting 131 receive the lugs 133 mounted to the inwardly facing surface of the central tube 112b, and a nut 124 (and possibly a washer) is mounted to the threaded end 125 of the driveshaft 118. The nut 124 is tightened against the end fitting 131, thereby tightly holding the brushes 114a and 114b on the driveshaft 118.

When the nut 124 is tightened against the end fitting 131, the compressive force is transmitted through the brush 114b to the end fitting 231, spacer 250 and end fitting 230. This compressive force is then transferred through the brush 114a to the end fitting 130. Thus, the act of tightening the nut 124 serves to place at least all end fittings and the spacer 250 in a state of compression. When the compressive forces overcome the resistance to deformation of the end fittings and the spacer 250, the end fittings and spacer are deformed. The deformation that takes place is a reduction in axial length and a corresponding increase in radial girth. The radial expansion causes the end fittings to form an excellent water and food-particle-proof seal at abutting surfaces of the end fittings and the brush central tubes. Furthermore, the radial expansion of the spacer 250 causes there to be formed a substantially water and food particle-proof seal at the juncture of the abutting surfaces of the spacer and the brush central tubes.

Before compression caused by tightening the nut 124, there can be small or no gaps between the axially opposing surfaces of the gasket 252 and the ends of the brushes 114a and 114b that preferably seat against these opposing surfaces during compression. If there are small gaps, the gaps are closed upon compression of the spacer 250, because the compressive force causes the brushes 114a and 114b to move toward one another in the axial direction. By closing the gap and/or further compressing the gasket 252 under the compressive force of the nut 124, there is a substantially water and food particle-proof seal at the juncture of the abutting surfaces.

Because the spacer 250 is made of a flexible material, the gasket 252 extending radially from the shoulders 256 and 258 is compressed between the facing ends of the brushes 114a and 114b. The gasket 252 fills any gap that exists between the brushes, thereby preventing, or at least restricting, particles and liquids from entering the central passages 116a and 116b. The juncture of the shoulders 256 and 258 and the central tubes 112a and 112b are also sealed when the nut 124 compresses the assembly 110, which also restricts entry of particles or liquids between the brushes and the driveshaft. If the brush 114a is slightly shorter than the brush 114b, the spacer 250 automatically shifts along the driveshaft, from the exact center to slightly offset from center, when the nut 124 is tightened.

Compression by tightening the nut 124 has the effect of deforming the end fittings and spacer in the radial direction both inwardly toward the driveshaft and outwardly toward the brush tubes' inner surfaces. The deformation creates a tight contact between the surfaces of the respective components, thereby forming a substantially water and food particle-proof seal at the juncture of the abutting surfaces.

Each shoulder adjacent a corresponding end fitting will preferably come into contact with the end fitting prior to the radially extending gasket 252 touching the end of the corresponding central tube. The gap formed from the gasket 252 to the ends of the central tubes is then eliminated when the entire assembly 110 is placed in a state of compression by the tightening of the nut 124, because the combined axial length of the end fittings and the spacer is reduced due to the compression. This compression simultaneously causes the radial expansion of the end fittings and the spacer, thereby placing their surfaces in tight proximity to the driveshaft in the center and the central tubes of the brushes in the radially outward direction. As the axial dimension is reduced due to the already described compression the radial gasket 252 surface contacts the ends of the central tubes.

Because the dimension of the gasket is significantly less than the center portion of the spacer 250 and the contacted end fittings, the compression possible in the gasket 252 is very small in comparison to the spacer's central region and the end fittings. This small compression effectively limits the overall compressive travel of the end fittings and spacer to a fixed dimension that is desirable to reach the proper fit of the assembly parts and the proper radial expansion of the inner components, thus reaching an optimum fit and seal. Once the shoulder 256 is so compressed and extended into the central tube 112a, a substantially water and food particle-proof seal is formed at the juncture of the abutting surfaces.

It is desirable to periodically replace worn brushes in the machines described above, and this is accomplished by removing the brush and driveshaft as an assembly, threadingly removing the brush or brushes to be replaced, and placing one or more new brushes on the driveshaft. Then the entire assembly is reinserted into the machine.

In addition to making replacement of brushes more economical, due to the need to replace only one half of the brush length of the assembly, the components described above permit one to vary the characteristics of the brush assembly based upon the location in the machine. For example, sometimes a coarse brush is required where the food items enter the machine, and a softer or less aggressive brush is required near the exit of the machine. Using the apparatus described above, two different kinds of brushes can be placed on a brush assembly with the desired characteristics only where necessary. One can use a coarse brush for the brush 114a in FIG. 2, and a softer brush for the brush 114b in FIG. 2, or vice versa.

Figure 6:
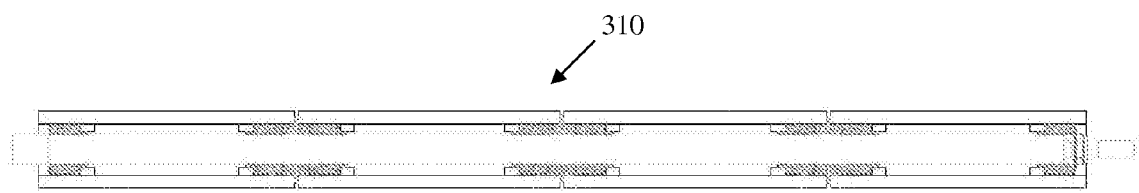
FIG. 6 is a side view in section illustrating another embodiment of the present invention.

Although the explanation above describes the two brushes 114a and 114b on the driveshaft 118, it is contemplated that three, four, five, six or more brushes can be placed on a similar driveshaft. For example, the brush assembly 310 shown in FIG. 6 has four brushes and three spacers. Furthermore, although the brushes 114a and 114b are of equal length, it is contemplated that the brushes can be of unequal length. A person having skill in the technology will understand that the invention can be adapted in various ways by placing a spacer, which would be substantially identical to the spacer 250, between each adjacent pair of brushes and placing end fittings and other components where needed.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A rotatable, elongated brush assembly through which a driveshaft extends for being drivingly linked to a rotating drive member, the brush assembly comprising:
   (a) a first elongated brush having a central tube through which the driveshaft extends, bristles extending radially therefrom and opposing first and second ends;
   (b) a second elongated brush having a central tube through which the driveshaft extends, bristles extending radially therefrom and opposing first and second ends, the second brush being substantially coaxial to, and aligned in series on the driveshaft with, the first brush;
   (c) first, second, third and fourth end fittings disposed near the respective ends of the central tubes between the driveshaft and the central tubes; and
   (d) a spacer mounted between, and seating against, the second and third end fittings and mounted between adjacent ends of the brushes, the spacer having a body with radially outwardly facing shoulders at opposing body ends, a plurality of inwardly facing sidewalls angled relative to one another and joining at intersections to define a central passage through which the driveshaft extends in substantially sealing contact with the inwardly facing sidewalls of the spacer, and a gasket extending radially outwardly from the body a substantial distance to permit the adjacent ends of the brushes to seat against opposing sides of the gasket and against the shoulders to form a sealed juncture.

2. The brush assembly in accordance with claim 1, wherein the spacer's shoulders are circular cylindrical and the gasket is disposed substantially equidistant from the opposing body ends.

3. The brush assembly in accordance with claim 2, wherein the plurality of inwardly facing sidewalls on the spacer substantially form a square in cross section.

4. The spacer in accordance with claim 2, wherein the gasket is a compressible material that is in a state of compression between the adjacent ends of the brushes.

5. A rotatable, elongated brush assembly through which a driveshaft extends for being drivingly linked to a rotating drive member, the brush assembly comprising:
(a) a first elongated brush having a central tube through which the driveshaft extends, bristles extending radially therefrom and opposing first and second ends;
(b) a second elongated brush having a central tube through which the driveshaft extends, bristles extending radially therefrom and opposing first and second ends, the second brush being substantially coaxial to, and aligned in series on the driveshaft with, the first brush;
(c) first, second, third and fourth end fittings disposed near the respective ends of the central tubes between the driveshaft and the central tubes;
(d) a spacer mounted between, and seating against, the second and third end fittings and mounted between adjacent ends of the brushes, the spacer having a body with radially outwardly facing shoulders at opposing body ends, a plurality of inwardly facing sidewalls angled relative to one another and joining at intersections to define a central passage through which the driveshaft extends, and a gasket extending radially outwardly from the body a substantial distance to permit the adjacent ends of the brushes to seat against opposing sides of the gasket and against the shoulders to form a sealed juncture; and
wherein the first brush is substantially different from the second brush, thereby the first brush having a substantially different effect than the second brush on any object the first brush strikes.

6. A spacer mounted on a driveshaft between adjacent ends of two substantially coaxial and serially aligned brushes in a rotatable, elongated brush assembly through which the driveshaft extends for drivingly linking the driveshaft to a rotating drive member, the spacer comprising:
(a) a body having radially outwardly facing shoulders at opposing body ends that insert into adjacent ends of the brushes and substantially sealingly abut radially inwardly facing surfaces of the respective brushes;
(b) a plurality of radially inwardly facing sidewalls angled relative to one another and joining at intersections to define a central passage through the body through which the driveshaft extends in substantially sealing contact with the inwardly facing sidewalls of the spacer; and
(c) a gasket extending radially outwardly from the body a substantial distance with the facing ends of the brushes seated against the gasket and the shoulders to form a sealed juncture.

7. The spacer in accordance with claim 6, wherein the shoulders are circular cylinders and the gasket is disposed substantially equidistant from the opposing body ends.

8. The spacer in accordance with claim 7, wherein the gasket extends farther in the radial direction than in the axial direction.

\* \* \* \* \*